United States Patent
McKisic

(10) Patent No.: US 9,851,016 B2
(45) Date of Patent: Dec. 26, 2017

(54) PRESSURE RELIEF VALVE FOR RAILROAD TANK CARS

(71) Applicant: TRINITY TANK CAR, INC., Dallas, TX (US)

(72) Inventor: Aubra D. McKisic, Flower Mound, TX (US)

(73) Assignee: Trinity Tank Car, Inc., Dallas, TX (US)

(*) Notice: Subject to any disclaimer, the term of this patent is extended or adjusted under 35 U.S.C. 154(b) by 0 days.

(21) Appl. No.: 14/892,656

(22) PCT Filed: Jan. 5, 2015

(86) PCT No.: PCT/US2015/010171
§ 371 (c)(1),
(2) Date: Nov. 20, 2015

(87) PCT Pub. No.: WO2015/103544
PCT Pub. Date: Jul. 9, 2015

(65) Prior Publication Data
US 2016/0312914 A1    Oct. 27, 2016

Related U.S. Application Data

(60) Provisional application No. 61/924,146, filed on Jan. 6, 2014.

(51) Int. Cl.
*B60K 15/035* (2006.01)
*F16K 31/56* (2006.01)
(Continued)

(52) U.S. Cl.
CPC ............... *F16K 31/56* (2013.01); *B61D 5/00* (2013.01); *B65D 88/12* (2013.01); *B65D 90/34* (2013.01);
(Continued)

(58) Field of Classification Search
CPC .......... F16K 17/04; F16K 27/07; F16K 31/56; F16K 3/24; F16K 15/063; B61D 5/00;
(Continued)

(56) References Cited

U.S. PATENT DOCUMENTS

| 2,510,098 A | 6/1950 | Geisler |
| 2,528,600 A | 11/1950 | Lombard |

(Continued)

OTHER PUBLICATIONS

Office Action issued by the Canadian Intellectual Property Office for Application No. 2,912,474; PCT No. US2015010171; Owner: Trinity Tank Car, Inc.—dated Oct. 17, 2016.
(Continued)

*Primary Examiner* — Jessica Cahill
(74) *Attorney, Agent, or Firm* — Baker Botts, LLP

(57) ABSTRACT

According to some embodiments, a pressure relief valve system comprises a valve body coupled to a pressure chamber. The valve body defines a vapor flow path between the pressure chamber and the atmosphere. A valve orifice in the valve body is configured to allow vapor to flow between the pressure chamber and the valve body. A vapor conduit comprises a vapor conduit first end coupled to the valve orifice and a second end opening into the pressure chamber. The vapor conduit forms a passageway between the vapor conduit first and second end. The vapor conduit also comprises a vapor conduit orifice near its first end. The vapor conduit orifice is configured to allow the vapor to flow from the pressure chamber into the vapor conduit. A gravity-operated valve positioned near the vapor conduit first end is configured to control the flow of vapor through the vapor conduit orifice.

18 Claims, 10 Drawing Sheets

(51) Int. Cl.
*F16K 15/06* (2006.01)
*F16K 27/07* (2006.01)
*B61D 5/00* (2006.01)
*B65D 88/12* (2006.01)
*B65D 90/34* (2006.01)
*B65G 67/04* (2006.01)
*F16K 3/24* (2006.01)
*F16K 17/04* (2006.01)

(52) U.S. Cl.
CPC ............... *B65G 67/04* (2013.01); *F16K 3/24* (2013.01); *F16K 15/063* (2013.01); *F16K 17/04* (2013.01); *F16K 27/07* (2013.01)

(58) Field of Classification Search
CPC ........ B65G 67/04; B65D 88/12; B65D 90/34; Y10T 137/0753; Y10T 137/0874; Y10T 137/3003; Y10T 137/3084; Y10T 137/7293
See application file for complete search history.

(56) References Cited

U.S. PATENT DOCUMENTS

| | | | |
|---|---|---|---|
| 3,391,818 A | 7/1968 | Hairston | |
| 3,845,846 A | 11/1974 | Needham | |
| 3,970,098 A * | 7/1976 | Boswank | F16K 17/36 137/39 |
| 4,005,724 A * | 2/1977 | Courtot | F16K 17/366 137/38 |
| 4,203,458 A * | 5/1980 | Barrett | B64D 37/20 137/38 |
| 4,325,398 A * | 4/1982 | Green | F16K 17/366 137/202 |
| 5,246,027 A | 9/1993 | Morris | |
| 6,701,952 B1 * | 3/2004 | Ehrman | B60K 15/03519 137/202 |
| 6,708,716 B2 * | 3/2004 | Schultz | F15B 21/044 137/199 |
| 2006/0213553 A1 * | 9/2006 | Mills | B60K 15/03519 137/43 |
| 2006/0266415 A1 * | 11/2006 | Ganachaud | B60K 15/03519 137/202 |

OTHER PUBLICATIONS

PCT International Preliminary Report on Patentability for International application No. PCT/US2015/010171—dated Jul. 21, 2016.
Canadian Office Action received for Canadian Patent Application No. 2912474, dated Jul. 5, 2017; 7 pages.

* cited by examiner

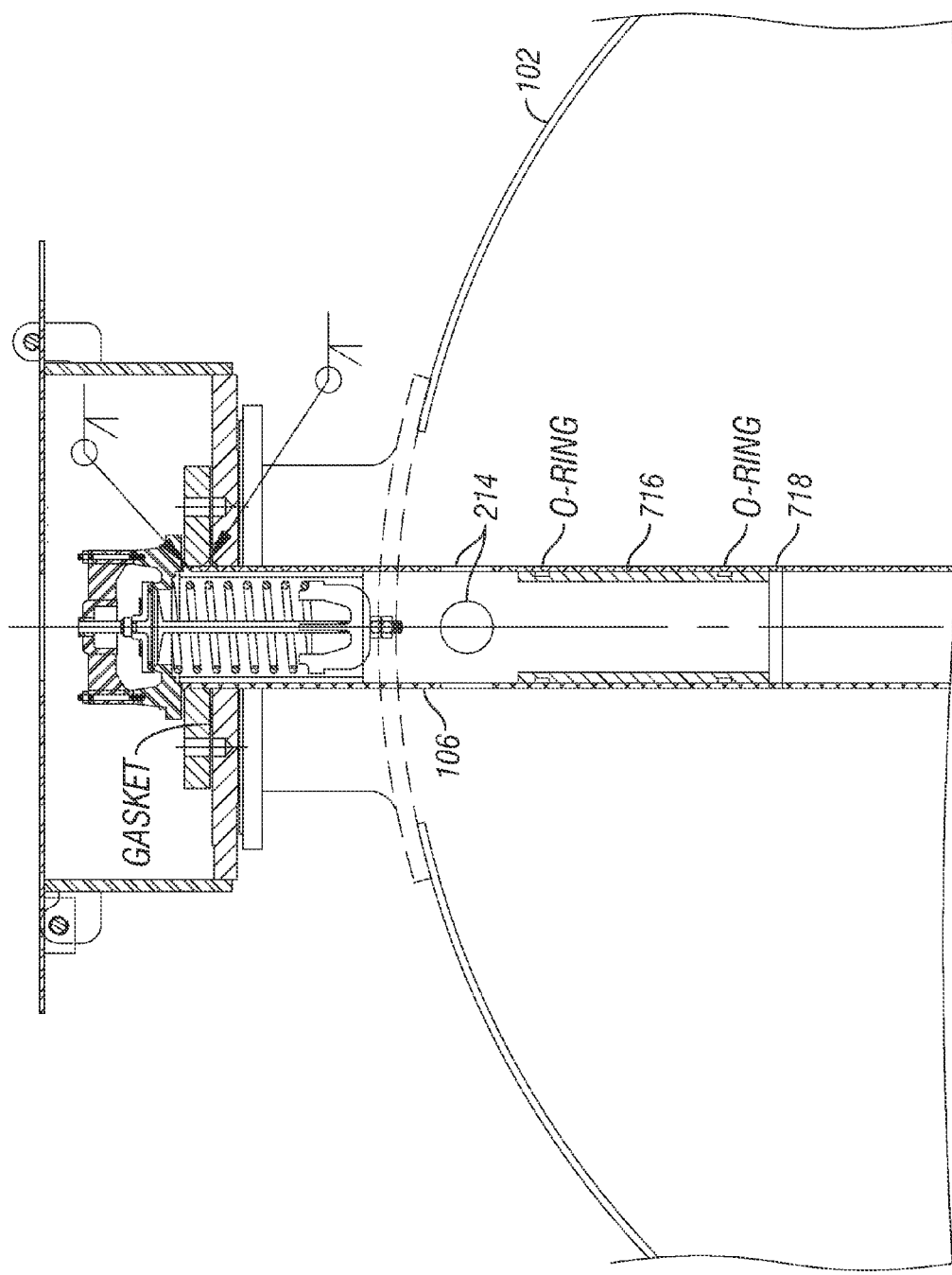

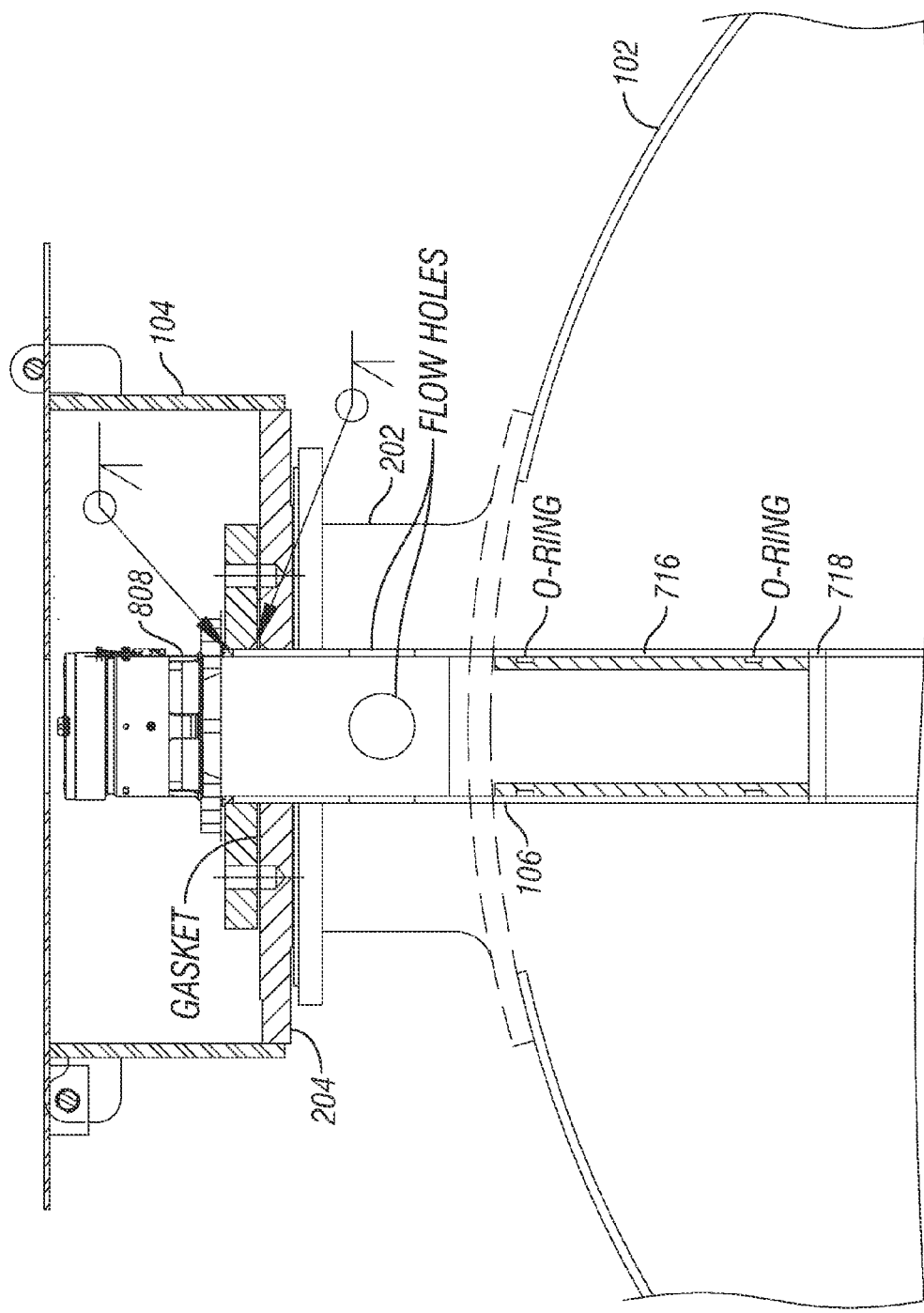

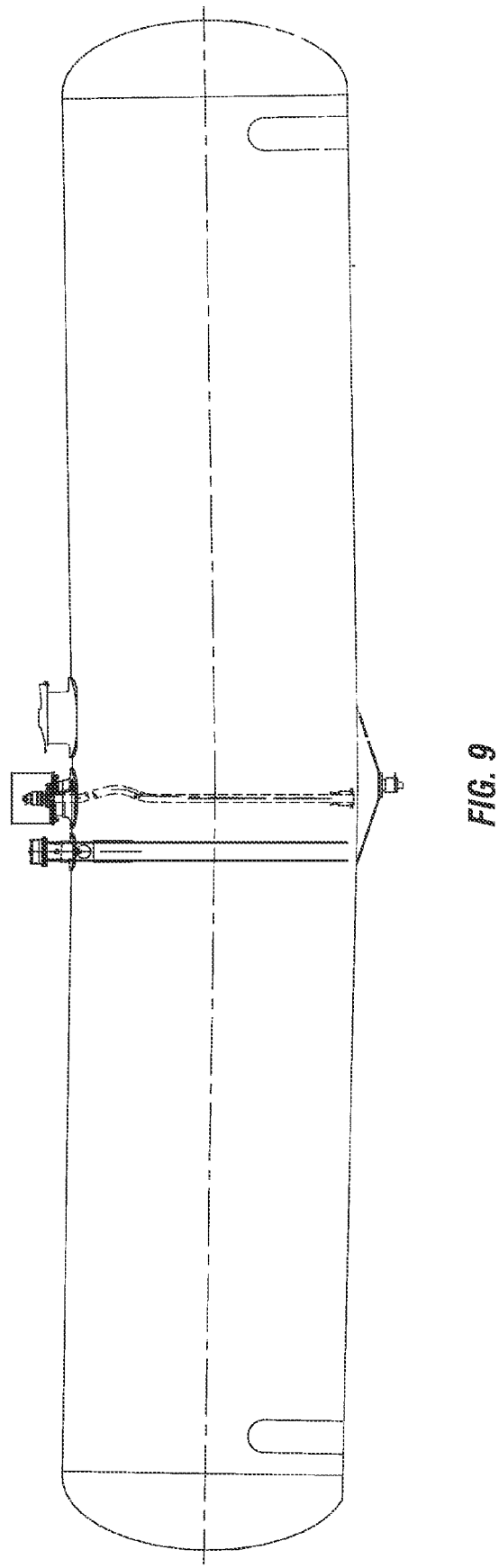

PRESSURE RELIEF VALVE FOR RAILROAD TANK CARS

RELATED APPLICATIONS

This application is a U.S. National Stage Filing under 35 U.S.C. §371 of International Patent Application Serial No. PCT/US2015/010171 filed Jan. 5, 2015 and entitled "Improved Pressure Relief Valve for Railroad Tank Cars" and claims priority to U.S. Provisional Application Ser. No. 61/924,146, entitled "IMPROVED PRESSURE RELIEF VALVE FOR RAILROAD TANK CARS," filed Jan. 6, 2014.

TECHNICAL FIELD

This disclosure generally relates to pressure relief valve systems, and more particularly to a pressure relief valve system for railroad tank cars.

BACKGROUND

Railroad tank cars transport bulk liquids such as oil or ethanol. Regulations require most railroad tank cars operating in North America be equipped with pressure relief devices. Pressure relief devices protect the tank from events such as product surges, over fills, and commodity reactions, but the primary purpose is preventing catastrophic tank failure by regulating pressure within the tank during a fire condition. The contents of the tank exist in a two-phase state—the liquid phase tank lading (commodity for transport) and the vapor phase above the lading. For normal ambient temperature liquid commodities the vapor phase is approximately atmospheric pressure. In a fire situation, heat input to the tank drastically increases the vapor pressure until it exceeds the pressure relief device safety setting and vapor is expelled.

Existing pressure relief devices are generally located near the center of the tank along its longitudinal center line. This location places the pressure relief device in communication with the vapor space above the tank lading when the tank is oriented in its normal operating position. A properly sized relief device is effective at relieving pressure during a fire situation by discharging vapor at a rate greater than or equal to the rate at which the pressure is generated.

In a derailment and roll-over situation, the tank car is no longer oriented in its normal operating position and the pressure relief device may no longer be in communication with the vapor space. Instead, the pressure relief device may be in communication with the liquid space. In this situation, the pressure relief device will expel liquid instead of vapor. Expelling liquid is problematic for several reasons. If the liquid is flammable, it may continue to fuel the fire and accelerate the temperature increase. Furthermore, because the pressure buildup is mainly caused by the vapor mass, expelling liquid does not relieve pressure at the same rate as expelling vapor. Additionally, a decrease in liquid mass increases heat transfer to the tank, further accelerating the pressure buildup.

SUMMARY

According to some embodiments, a pressure relief valve system comprises a valve body coupled to a pressure chamber. The valve body defines a vapor flow path between the pressure chamber and the atmosphere. A valve orifice in the valve body is configured to allow a vapor to flow between the pressure chamber and the valve body. A vapor conduit comprises a vapor conduit first end coupled to the valve orifice and a vapor conduit second end opening into the pressure chamber. The vapor conduit forms a passageway between the vapor conduit first end and the vapor conduit second end. The vapor conduit also comprises a vapor conduit orifice near the vapor conduit first end. The vapor conduit orifice is configured to allow the vapor to flow from the pressure chamber into the vapor conduit. A gravity-operated valve positioned near the vapor conduit first end is configured to control the flow of the vapor through the vapor conduit orifice. The gravity-operated valve operable to unseal the vapor conduit orifice when the valve body is positioned above a horizontal axis of the pressure chamber and substantially seal the vapor conduit orifice when the valve body is positioned below the horizontal axis of the pressure chamber.

In particular embodiments, the gravity-operated valve comprises a vapor conduit sleeve slidably positioned around the vapor conduit first end. The vapor conduit sleeve is configured to control the flow of the vapor through the vapor conduit orifice. The vapor conduit sleeve is operable to slide to a first position unsealing the vapor conduit orifice when the valve body is positioned above a horizontal axis of the pressure chamber and slide to a second position substantially sealing the vapor conduit orifice when the valve body is positioned below the horizontal axis of the pressure chamber.

Certain embodiments may provide one or more technical advantages. In some embodiments, the pressure relief system improves the survivability of tank cars in fire situations. The vapor conduit and conduit sleeve allow the pressure relief valve system to be in communication with the vapor space whether in an upright or roll-over position, efficiently relieving pressure in either orientation. Another advantage of some embodiments is that tank car owners can increase their existing tank's fire survivability time without retrofitting expensive insulating materials to the tanks.

As a result, particular embodiments of the present disclosure may provide numerous technical advantages. Particular embodiments the present disclosure may provide some, none, all, or additional technical advantages.

BRIEF DESCRIPTION OF THE DRAWINGS

A more complete and thorough understanding of the particular embodiments and advantages thereof may be acquired by referring to the following description taken in conjunction with the accompanying drawings, in which like reference numbers indicate like features, and wherein:

FIG. 7 is a cross-sectional view of an embodiment of a pressure relief valve system with a conduit sleeve internal to a vapor conduit;

FIG. 8 is a cross-sectional view of an embodiment of a pressure relief valve system with a pressure relief valve spring assembly; and FIG. 9 is a cross-sectional side view of an example pressure relief valve system retro-fitted to a railway tank car.

DETAILED DESCRIPTION

Particular embodiments and their advantages are best understood by reference to FIGS. 1A through 9 wherein like reference numbers indicate like features.

Figure 1A:
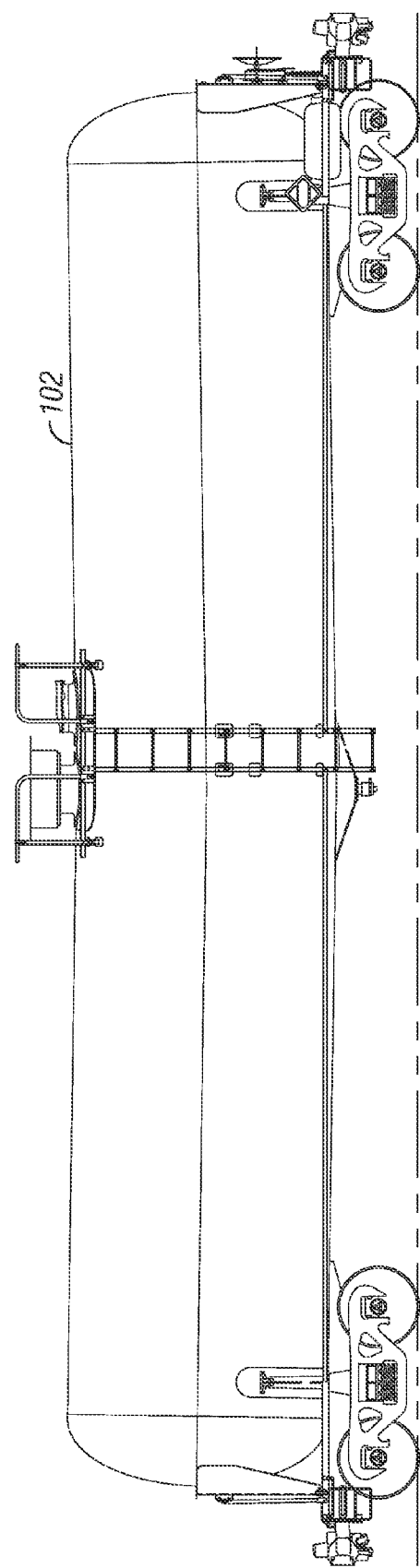
FIG. 1A is a side view of an example railway tank car.

FIG. 1A is a side view of an example railway tank car. The railway tank car comprises tank 102. Tank 102 is a railroad car tank designed to transport liquid commodities. Tank 102 may be pressurized or non-pressurized, insulated or non-insulated, and may be designed for single or multiple commodities. Tank 102 may be constructed of any suitable material such as carbon steel, aluminum alloy, high alloy steel, or nickel plate steel. The contents of tank 102 comprise a liquid phase tank lading (the commodity for transport) and a gaseous vapor phase above the lading.

Figure 1B:
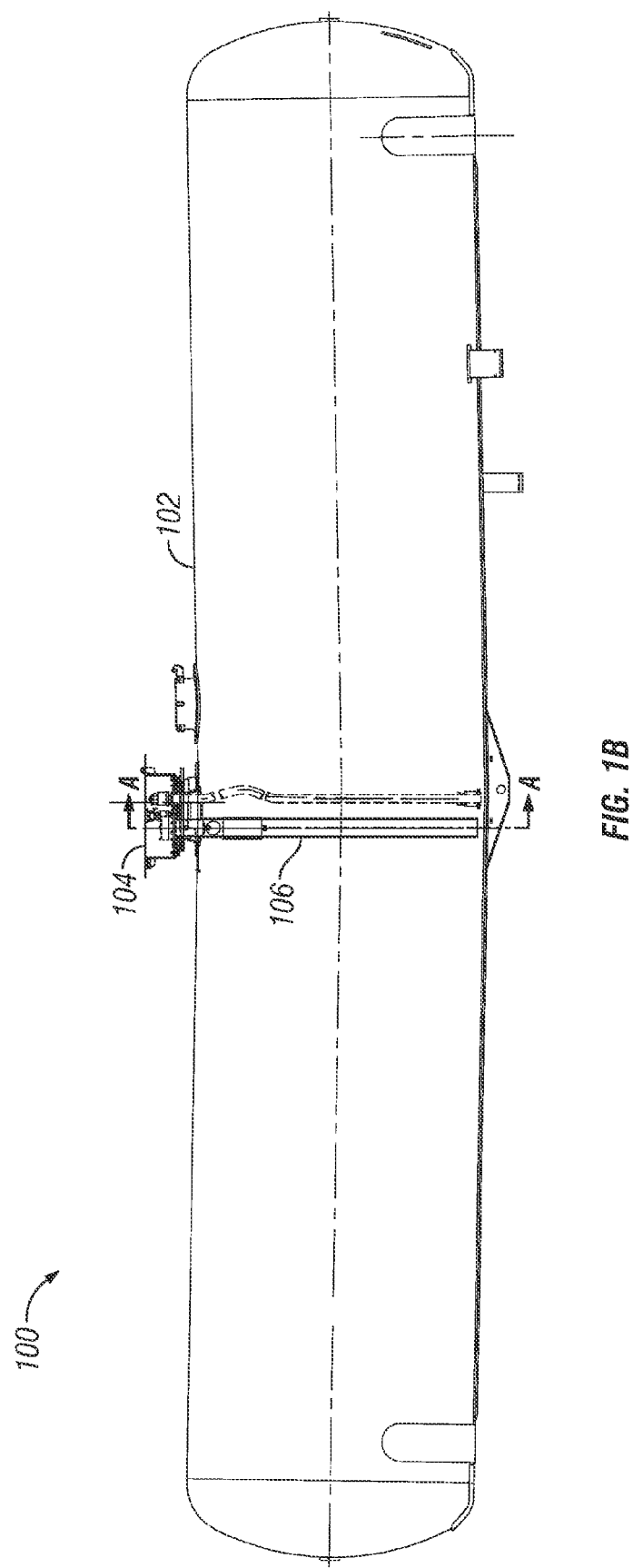
FIG. 1B is a cross-sectional side view of an example pressure relief valve system of a railway tank car.

FIG. 1B is a cross-sectional side view of an example pressure relief valve system of a railway tank car. FIG. 1B illustrates pressure relief valve system 100 comprising tank 102, pressure relief valve housing 104, and vapor conduit 106.

Pressure relief valve housing 104 is coupled to tank 102. In the illustrated embodiment, pressure relief valve housing 104 is located near the center of tank 102 along its longitudinal center line. Pressure relief valve housing 104 houses a pressure relief valve constructed of any suitable material compatible with the lading of tank 102. The pressure relief valve is sized to permit sufficient flow capacity to prevent pressure build up in tank 102 under fire conditions. As an example, Appendix A of the Association of American Railroads Specification defines a flow rating pressure for tank cars. In the illustrated embodiment, pressure relief valve housing 104 houses a reclosing safety relief valve. In some embodiments, pressure relief valve housing 104 may house other pressure relief devices such as rupture disks, safety vents, and combination devices. The pressure relief device protects tank 102 from events such as product surges, over fills, commodity reactions, and prevents catastrophic failure of tank 102 by regulating pressure within tank 102 during a fire condition. Pressure relief valve housing 104 and the pressure relief components housed within may generally be referred to as the valve body.

Vapor conduit 106 is coupled to pressure relief valve housing 104 and extends into tank 102. In some embodiments, vapor conduit 106 extends from the bottom of relief valve housing 104 to within a few inches of the opposite interior wall of tank 102. The length of vapor conduit 106 may vary depending on the size of tank 102 and the commodity contained in tank 102. In some embodiments, vapor conduit 106 may comprise a plurality of threaded sections. The threaded sections may be coupled together to form varying lengths of conduit. Vapor conduit 106 may be constructed of stainless steel or any other material compatible with the lading of tank 102 and suitable for creating a vapor passageway.

Figure 2:
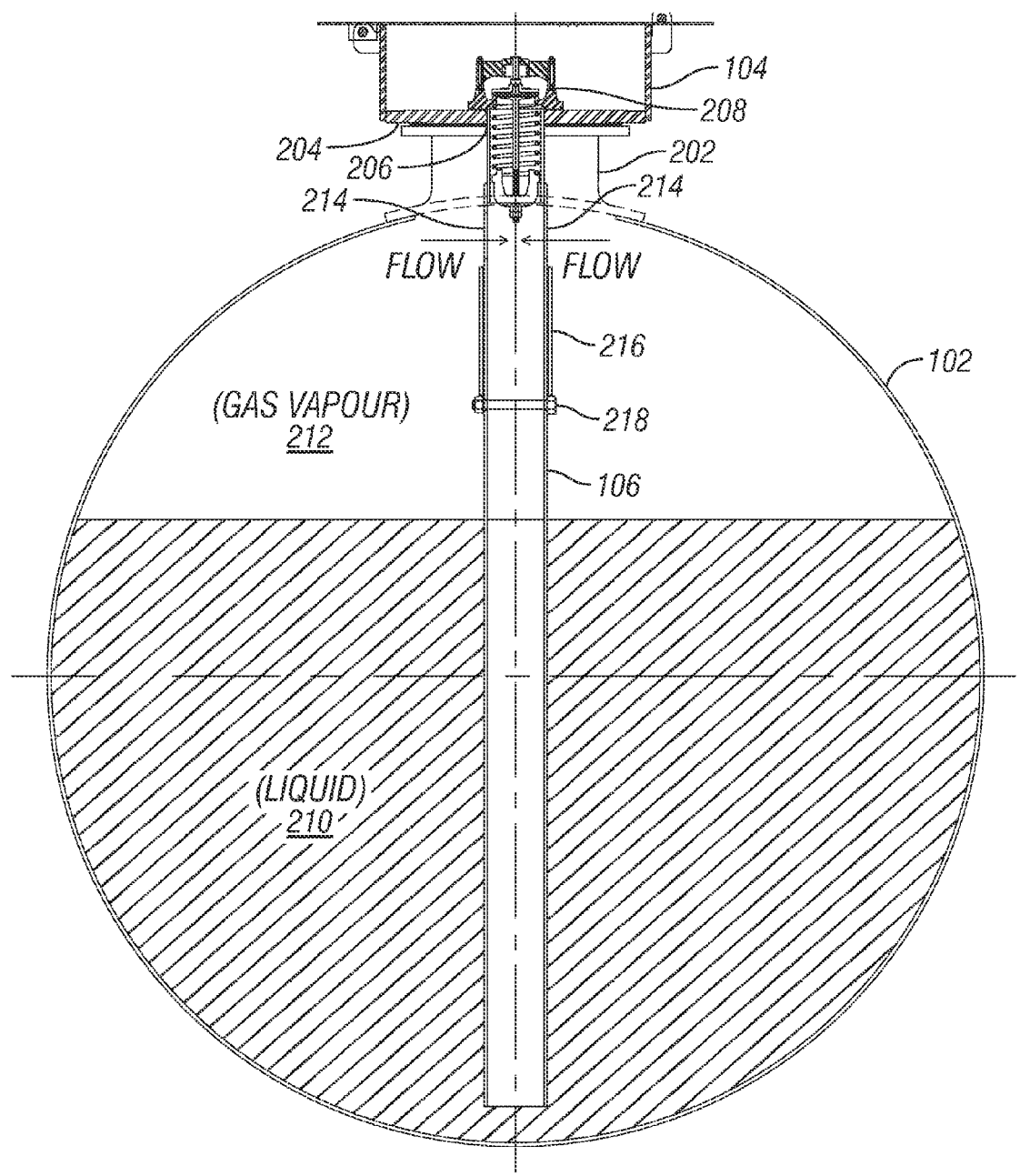
FIG. 2 is a cross-sectional view of the pressure relief valve system of FIG. 1B in an upright position, in accordance with particular embodiments.

FIG. 2 is a cross-sectional view of the pressure relief valve system of FIG. 1B in an upright position, in accordance with particular embodiments. FIG. 2 illustrates cover plate 202 of pressure relief valve housing 104 coupled to mounting flange 202 of tank 102. Pressure relief valve housing 104 comprises cover plate 204, valve orifice 206, and spring loaded valve assembly 208. Tank 102 contains liquid 210 and vapor 212. Vapor conduit 106 is coupled to cover plate 204 and extends into tank 102. Vapor conduit orifice 214 is disposed in vapor conduit 106 near the end of vapor conduit 106 closest to pressure relief valve housing 104. Conduit sleeve 216 is slidably coupled to vapor conduit 106 and positioned near vapor conduit orifice 214. Sleeve stop 218 is coupled to vapor conduit 106.

Under normal operating pressure, spring loaded valve assembly 208 is in sealing contact with cover plate 204 preventing vapor 212 from escaping tank 102. Under high pressure conditions such as a fire situation, heat input to tank 102 increases the vapor pressure in tank 102 until it exceeds the safety setting of spring loaded valve assembly 208. The high vapor pressure causes spring loaded valve assembly 208 to open and expel vapor 212 from tank 102 through valve orifice 206. The diameters of valve orifice 206 and vapor conduit 106 depend on the flow rating of the pressure relief device housed in pressure relief valve housing 104 as determined based on the particular specifications of tank 102.

In normal upright operating position, as illustrated, pressure relief valve housing 104 is located on top of tank 102. Vapor conduit 106 extends longitudinally from cover plate 204 towards the bottom of tank 102. In the upright position, gravity holds conduit sleeve 216 against sleeve stop 218. When conduit sleeve 216 is resting against sleeve stop 218, vapor 212 is able to pass from the vapor portion of tank 102 to vapor conduit 106 through conduit orifice 214 (illustrated by arrows marked FLOW).

Conduit sleeve 216 is an example of a gravity-operated valve operable to substantially seal or unseal conduit orifice 214. Conduit sleeve 216 is free to slide along the longitudinal axis of vapor conduit 106. Conduit sleeve 216 may be constructed of nylon, ultra high molecular weight (UHMW) polyethylene, or any other material compatible with the lading of tank 102 and suitable for sliding along vapor conduit 106. In some embodiments, conduit sleeve 216 may comprise weights to aid in overcoming friction between conduit sleeve 216 and vapor conduit 106. Some embodiments may comprise O-rings disposed between conduit sleeve 216 and vapor conduit 106 to form a seal between conduit sleeve 216 and vapor conduit 106. Conduit sleeve 216 is sized to substantially prevent liquid 210 from entering conduit orifice 214 when conduit sleeve 216 is positioned along the portion of vapor conduit 106 comprising conduit orifice 214. One of skill in the art will appreciate other configurations of gravity-operated valves operable to substantially seal or unseal conduit orifice 214, such as swing valves or flapper valves.

Sleeve stop 218 limits the movement of conduit sleeve 216. Sleeve stop 218 may be constructed of stainless steel or any other material compatible with the lading of tank 102 and suitable for preventing conduit sleeve 216 from sliding on vapor conduit 106. In some embodiments, sleeve stop 218 may comprise a bolt passing horizontally through vapor conduit 106. Other embodiments may include detents coupled to the exterior wall of vapor conduit 106 and capable of limiting the motion of conduit sleeve 216. Sleeve stop 218 is positioned sufficiently below conduit orifices 214 so that conduit sleeve 216 does not block conduit orifices 214 when conduit sleeve 216 is resting against sleeve stop 218.

Conduit orifice 214 allows vapor 212 to flow between tank 102 and vapor conduit 106. Conduit orifice 214 is sized to permit at least the amount of vapor flow required by the pressure relief device housed in pressure relief valve housing 104. In some embodiments, conduit orifice 214 comprises a plurality of circular openings in vapor conduit 106. For example, four circular conduit orifices 214 may be evenly spaced around the circumference of vapor conduit 106. Other embodiments may include any shape openings in any configuration sized to provide the required amount of vapor flow without compromising the structural integrity of vapor conduit 106. Conduit orifice 214 is disposed in the top end of vapor conduit 106 closest to valve orifice 206.

In operation under high pressure conditions, pressure relief valve system 100 will expel vapor 212 from tank 102. In the illustrated embodiment, the expelled vapor flows through conduit orifice 214.

Figure 3:
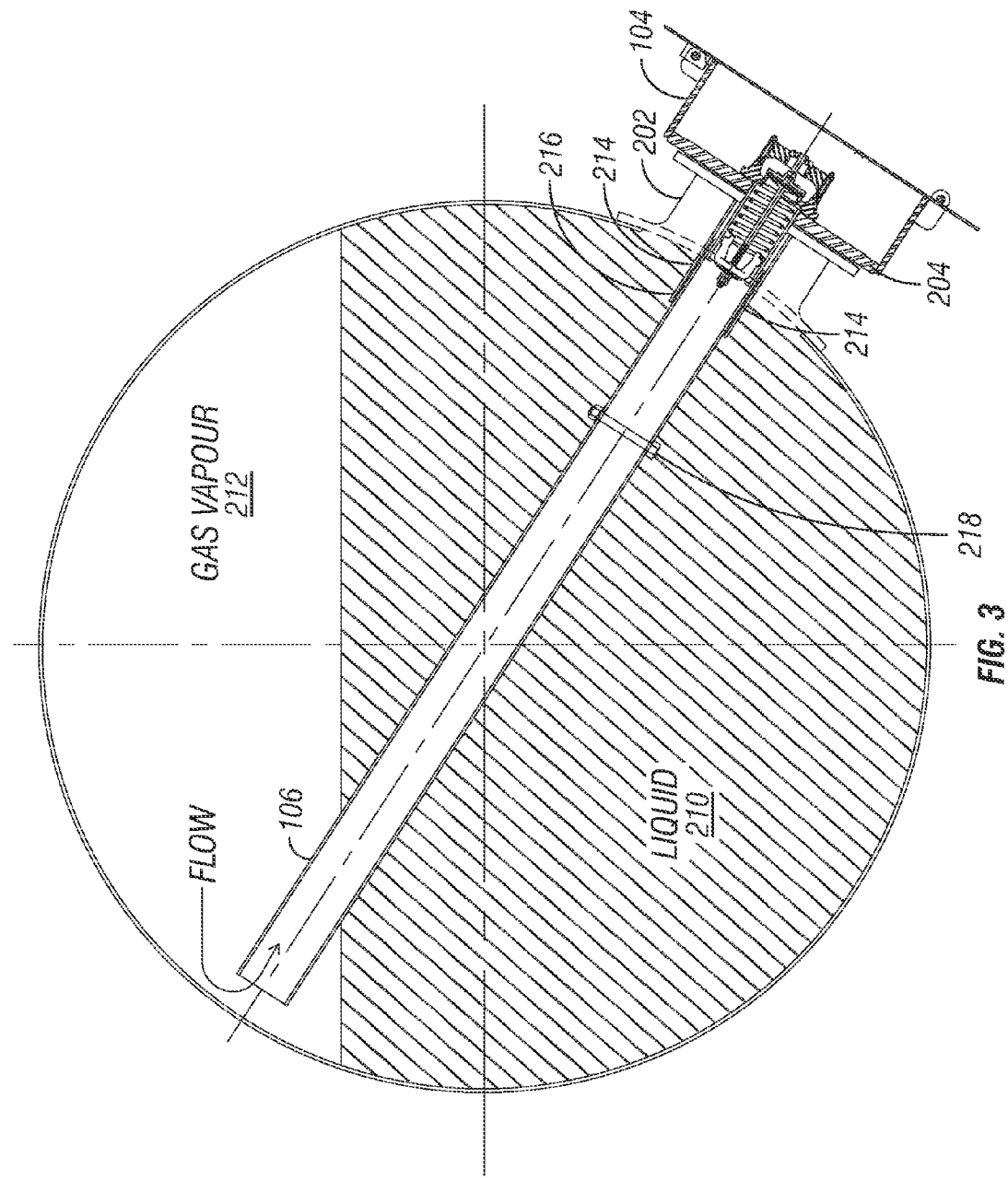
FIG. 3 is a cross-sectional view of the pressure relief valve system of FIG. 1B in a roll-over position, in accordance with particular embodiments.

FIG. 3 is a cross-sectional view of the pressure relief valve system of FIG. 1B in a roll-over position, in accordance with particular embodiments. In the roll-over position, pressure relief valve housing 104 may be located below the horizontal center line of tank 102. Vapor conduit 106 extends longitudinally from cover plate 204 towards the top of tank 102. In this position, gravity holds conduit sleeve 216 against cover plate 204. When conduit sleeve 216 is resting against cover plate 204, conduit sleeve 216 substantially prevents liquid 210 from passing through conduit orifice 214. In some embodiments, gravity may hold conduit sleeve 216 against a portion of mounting flange 202 or an additional sleeve stop (not illustrated) similar to sleeve stop 218.

In the roll-over position, the open radial end of vapor conduit 106 extends into the vapor space of tank 102. Vapor 212 is able to pass from the vapor portion of tank 102 to vapor conduit 106 through the open radial end of vapor conduit 106 (illustrated by arrow marked FLOW). At the same time, conduit sleeve 216 substantially prevents liquid 210 from entering vapor conduit 106 and passing through valve orifice 206.

In operation under high pressure conditions, pressure relief valve system 100 will expel vapor 212 from tank 102. In the illustrated embodiment, the expelled vapor flows through the open radial end of vapor conduit 106.

During a derailment, liquid 210 may enter vapor conduit 106 through the open radial end of vapor conduit 106 as tank 102 moves from an upright to a roll-over position. Similarly, liquid 210 may enter vapor conduit 106 through conduit orifice 214 before gravity fully seals conduit orifice 214 with conduit sleeve 216. During a high-pressure situation, pressure relief valve system 100 will initially expel liquid 210 that may be contained in vapor conduit 106. After initial expulsion of liquid 210, pressure relief valve system 100 will then expel vapor 212 from the vapor portion of tank 102.

Advantages of particular embodiments include various safety benefits. During a roll-over under high pressure conditions, such as a fire situation, pressure relief system 100 substantially prevents spring loaded valve assembly 208 from expelling potentially flammable liquid. Expelling liquid 210 is hazardous because it may further fuel the fire causing accelerated temperature and pressure increases within tank 102. Furthermore, expelling vapor 212 releases pressure in tank 102 quicker and more efficiently than expelling liquid 210. Additionally, a decrease in mass of liquid 210 in tank 102 increases heat transfer to tank 102, further accelerating the pressure buildup. Efficiently releasing pressure within tank 102 may prevent a catastrophic failure of tank 102 and enhances safety of nearby property as well as people such as emergency responders and bystanders.

In particular embodiments, exposed portions of pressure relief valve system 100, such as pressure relief valve housing 104, may be susceptible to damage in a roll-over situation. For example, an emergency event such as a roll-over may shear pressure relief valve housing 104 from tank 102. With a conventional pressure relief valve system, the opening remaining where the conventional housing used to attach to the tank will likely be in communication with the liquid portion of the tank and would likely expel potentially dangerous liquid. In pressure relief valve system 100, even if exposed portions of the system are damaged in an emergency event, vapor conduit 106 will likely remain intact within tank 102. Thus, any opening resulting from damage to the exposed portions of pressure relief valve system 100 will likely be in communication with the vapor portion of tank 102 and would likely expel vapor 212.

In some embodiments, conduit sleeve 216 may not completely seal conduit orifice 214 during a roll-over event. Particular orientations of tank 102 may also prevent conduit sleeve 216 from completely sealing conduit orifice 214. In some orientations of tank 102, the open radial end of vapor conduit 106 may be disposed partially in the vapor portion of tank 102 and partially in the liquid portion of tank 102. In these embodiments or orientations, pressure relief valve system 100 may expel both vapor 212 and liquid 210. The advantages of pressure relief valve system 100 described herein may still be realized and such advantages may be proportional to the amount of vapor expelled relative to the amount liquid expelled.

Figure 4:
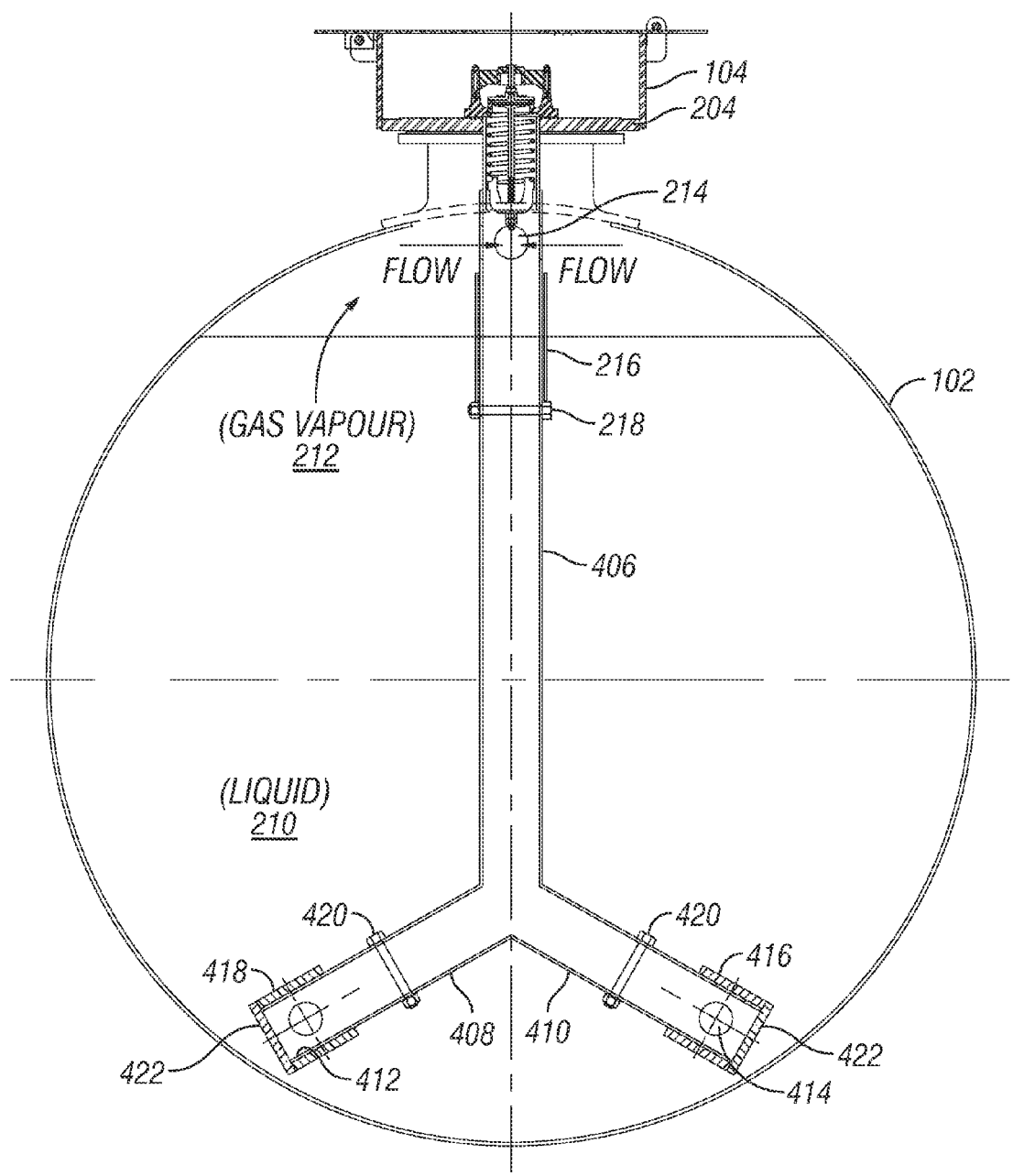
FIG. 4 is a cross-sectional view of an embodiment of a pressure relief valve system in an upright position and fitted with a Y-shaped vapor conduit.

FIG. 4 is a cross-sectional view of an embodiment of a pressure relief valve system in an upright position and fitted with a Y-shaped vapor conduit. FIG. 4 illustrates a pressure relief valve system similar to the system depicted in FIG. 2 where vapor conduit 406 is similar to vapor conduit 106. In FIG. 4, vapor conduit 406 also comprises left vapor conduit leg 408 and right vapor conduit leg 410. Vapor conduit 406 extends longitudinally from cover plate 204 towards the bottom of tank 102 where vapor conduit 406 branches into left vapor conduit leg 408 and right vapor conduit leg 410. Other embodiments may contain any suitable number of conduit legs. A suitable number and configuration of conduit legs may be at least partially determined by the size of tank 102 and the ratio of liquid 210 to vapor 212 in tank 102.

Left vapor conduit leg 408 comprises left conduit orifice 412, left conduit sleeve 418, and sleeve stops 420 and 422. Right vapor conduit leg 410 comprises right conduit orifice 414, right conduit sleeve 416, and sleeve stops 420 and 422. The conduits, conduit orifices, conduit sleeves, and sleeve stops are of similar size and construction as vapor conduit 106, conduit orifice 214, conduit sleeve 216, and sleeve stop 218, respectively, described in accordance with FIG. 2 above.

Sleeve stops 420 limit the movement of conduit sleeves 416 and 418 away from conduit orifices 412 and 414, respectively. Sleeve stops 422 are positioned to prevent conduit sleeves 416 and 418 from sliding off the ends of vapor conduit legs 408 and 410, respectively. In some embodiments, sleeve stops 422 may also seal the radial ends of vapor conduit legs 408 and 410 to prevent liquid 210 from entering the conduits through their radial ends.

In normal upright operating position, as illustrated, pressure relief valve system 100 operates similar to the system described in FIG. 2 above. Gravity holds conduit sleeve 216 against sleeve stop 218 and vapor 212 is able to pass from the vapor portion of tank 102 to vapor conduit 406 through conduit orifice 214 (illustrated by arrows marked FLOW). In operation under high pressure conditions, pressure relief valve system 100 expels vapor 212 from tank 102. In the illustrated embodiment, the expelled vapor flows through conduit orifice 214.

Figure 5:
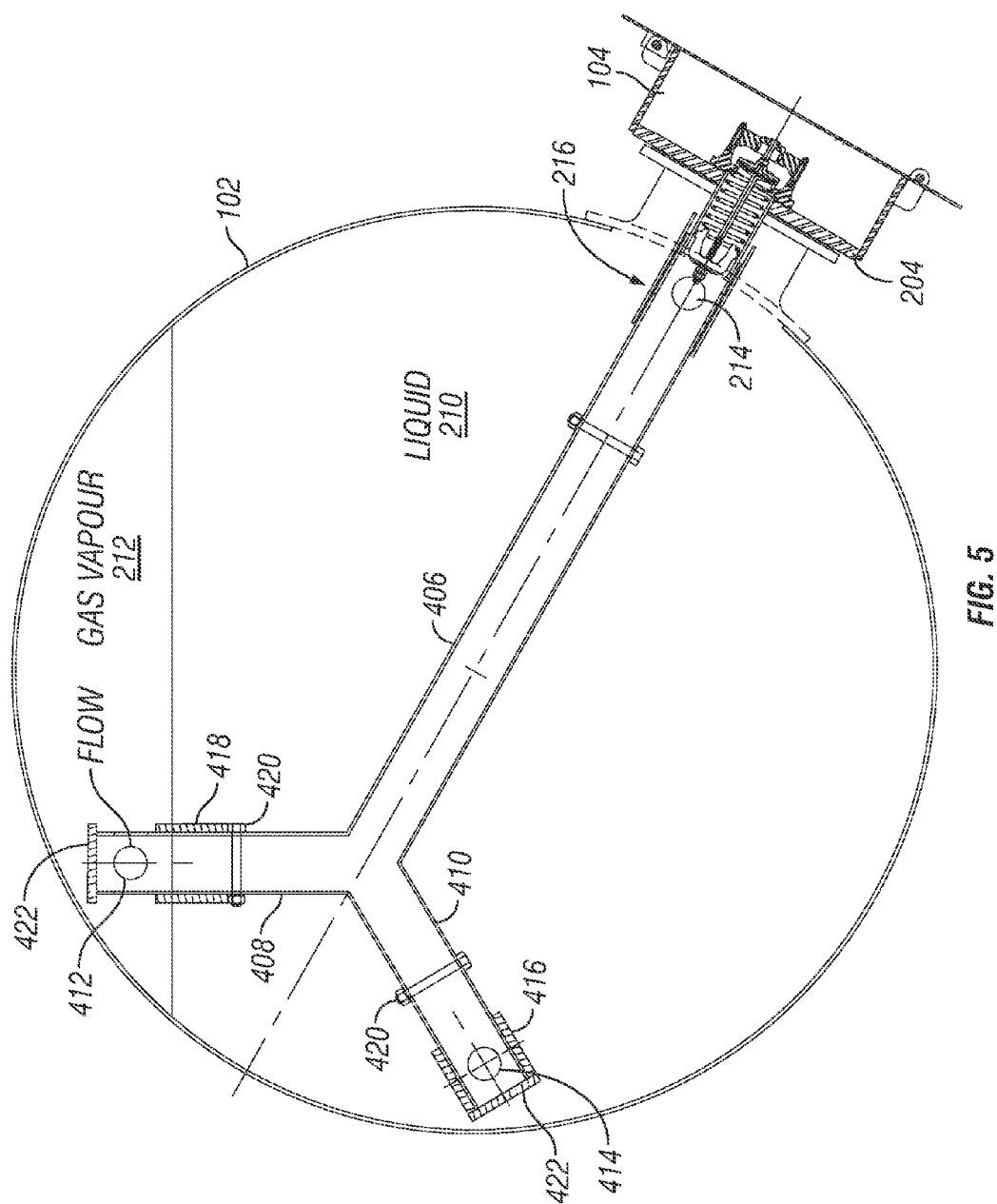
FIG. 5 is a cross-sectional view of an embodiment of a pressure relief valve system in a roll-over position and fitted with a Y-shaped vapor conduit.

FIG. 5 is a cross-sectional view of an embodiment of a pressure relief valve system in a roll-over position and fitted with a Y-shaped vapor conduit. In the roll-over position, pressure relief valve housing 104 is located below the horizontal center line of tank 102. Vapor conduit 406 extends longitudinally from cover plate 204 towards the top of tank 102 where vapor conduit 406 branches into left vapor conduit leg 408 and right vapor conduit leg 410. In this position, similar to the system described in FIG. 3 above, gravity holds conduit sleeve 216 against cover plate 204 and substantially prevents liquid 210 from passing through conduit orifice 214.

Right vapor conduit leg 410 is also submerged within the liquid portion of tank 102. Gravity holds right conduit sleeve 416 against sleeve stop 422. When right conduit sleeve 416 is resting against sleeve stop 422, right conduit sleeve 416 substantially prevents liquid 210 from passing through right conduit orifice 414.

Left vapor conduit leg 408 extends into the vapor portion of tank 102. Gravity holds left conduit sleeve 418 against sleeve stop 420. When left conduit sleeve 418 is resting against sleeve stop 420, vapor 212 is able to pass from the vapor portion of tank 102 to left vapor conduit leg 408 and vapor conduit 406 through left conduit orifice 412 (illustrated by arrow marked FLOW).

In operation under high pressure conditions, pressure relief valve system 100 will expel vapor 212 from tank 102. In the illustrated embodiment, the expelled vapor flows through left conduit orifice 412.

The embodiment illustrated in FIG. 5 depicts a roll-over in the clockwise direction. A roll-over in the counter-clockwise direction may result in left vapor conduit leg 408 extending into the vapor portion of tank 102 and right vapor conduit leg submerged in the liquid portion of tank 102. In such a scenario, gravity would seal left conduit orifice 412 with left conduit sleeve 418 and pressure relief valve system 100 would draw the expelled vapor from tank 102 through right conduit orifice 414. An advantage of a Y-shaped vapor conduit is the increased chance that one of the conduit legs will extend into the vapor space during a roll-over situation.

In another scenario, a vapor conduit orifice may not initially be in communion with the vapor space during a roll-over situation. In this case, the pressure relief valve will expel liquid. After some amount of time, the pressure relief valve may expel enough liquid that at least one vapor conduit orifice is in communion with the vapor space and the pressure relief valve is then able to more efficiently release pressure in the tank by expelling vapor. An advantage of a Y-shaped vapor conduit is the decreased time required for one of the conduit legs to extend into the vapor space during such a scenario.

Figure 6:
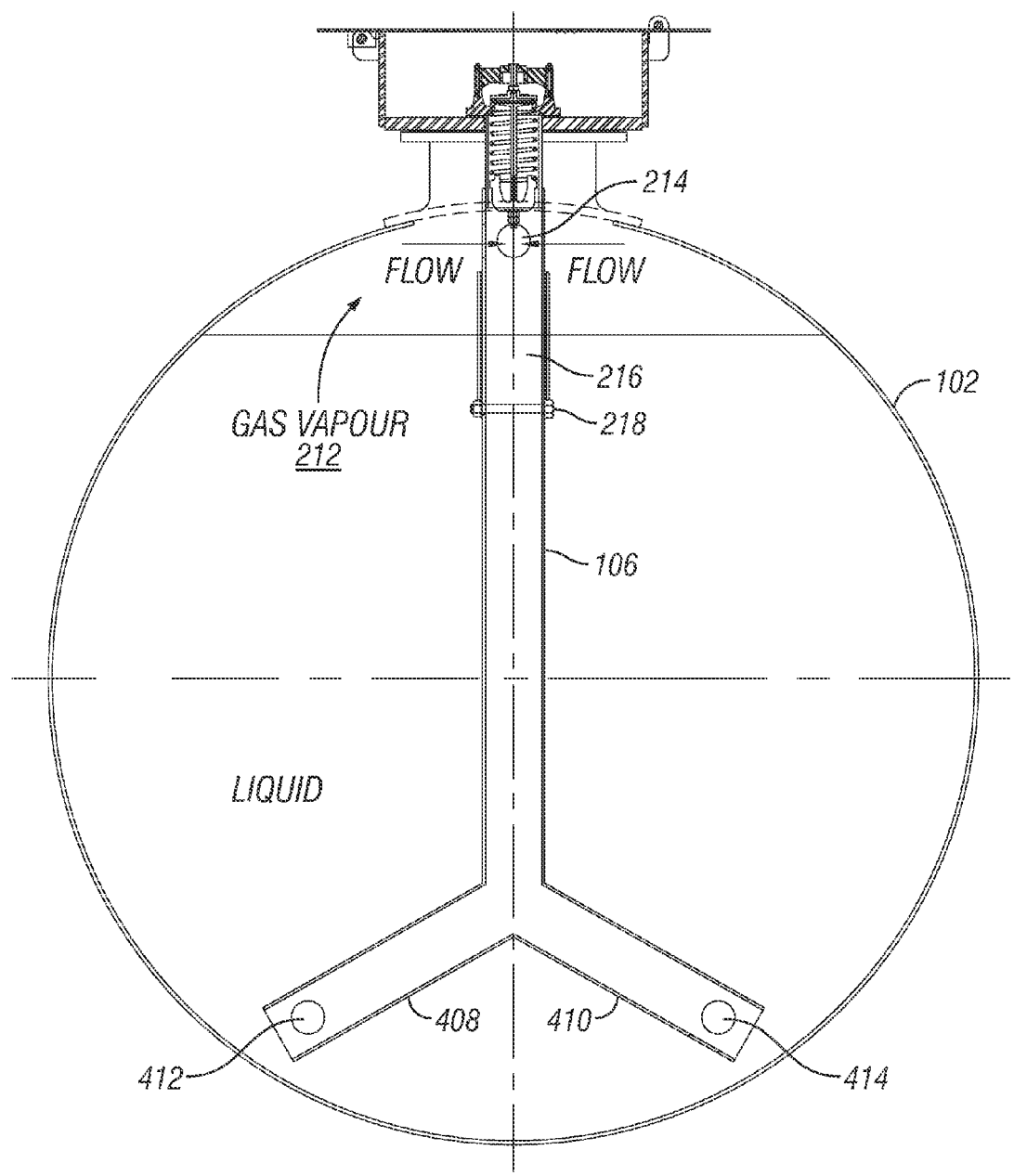
FIG. 6 is a cross-sectional view of a pressure relief valve system in an upright position and fitted with a Y-shaped vapor conduit, in accordance with particular embodiments.

FIG. 6 is a cross-sectional view of a pressure relief valve system in an upright position and fitted with a Y-shaped vapor conduit, in accordance with particular embodiments. FIG. 6 illustrates a pressure relief valve system similar to the system depicted in FIG. 4 without the conduit sleeves or sleeve stops on left vapor conduit leg 408 or right vapor conduit leg 410.

In operation under high pressure conditions in the upright position, pressure relief valve system 100 will expel vapor 212 from tank 102. In the illustrated embodiment, the expelled vapor flows through conduit orifice 214. In operation under high pressure conditions in a roll-over scenario, pressure relief valve system 100 may expel vapor 212 from tank 102 either through left conduit orifice 412 or right conduit orifice 414. Because neither left conduit orifice 412 or right conduit orifice 414 is sealed with a conduit sleeve, pressure relief valve system 100 may expel both vapor 212 and liquid 210 in some orientations of tank 102. The pressure relief valve system depicted in FIG. 6 may realize the same advantages as the pressure relief valve system depicted in FIG. 4 with the additional advantage of using fewer moving parts.

FIG. 7 is a cross-sectional view of an embodiment of a pressure relief valve system with a conduit sleeve internal to a vapor conduit. FIG. 7 illustrates a pressure relief valve system similar to the system depicted in FIG. 2 except that conduit sleeve 716 is slidably coupled to the interior of vapor conduit 106. Sleeve stop 718 is coupled to vapor conduit 106.

Conduit sleeve 716 is free to slide along the longitudinal axis of vapor conduit 106. Similar to conduit sleeve 216, conduit sleeve 716 may be constructed of any material compatible with the lading of tank 102 and suitable for sliding along vapor conduit 106 and may comprise weights to aid in overcoming friction between conduit sleeve 716 and vapor conduit 106. Some embodiments may comprise O-rings disposed between conduit sleeve 716 and vapor conduit 106 to form a seal between conduit sleeve 716 and vapor conduit 106.

Sleeve stop 718 limits the movement of conduit sleeve 716. Similar to sleeve stop 218, sleeve stop 718 may be constructed of any material compatible with the lading of tank 102 and suitable for preventing conduit sleeve 716 from sliding on vapor conduit 106. In some embodiments, sleeve stop 718 may comprise a bolt passing horizontally through vapor conduit 106. Other embodiments may include detents coupled to the interior wall of vapor conduit 106 and capable of limiting the motion of conduit sleeve 716.

Particular embodiments may comprise a combination of conduit sleeves both internal and external to the vapor conduit.

FIG. 8 is a cross-sectional view of an embodiment of a pressure relief valve system with a pressure relief valve spring assembly. FIG. 8 illustrates a pressure relief valve system similar to the system depicted in FIG. 7 except that spring loaded valve assembly 808 is positioned not to be in contact with the commodity contained in tank 102. In other embodiments, pressure relief valve housing 104 may house any pressure relief device suitable for relieving pressure in tank 102.

FIG. 9 is a cross-sectional side view of an example pressure relief valve system retro-fitted to a railway tank car. In the illustrated embodiment, pressure relief valve system 100 is installed adjacent to an existing assembly for removing or expelling the contents of the tank car. In some embodiments, pressure relief valve system 100 may function simultaneously with a traditional pressure relief valve. In some embodiments, the traditional pressure relief valve may be removed or plugged when pressure relief valve system 100 is retro-fitted to the tank car. In some embodiments, a vapor conduit comprising conduit orifices along with conduit sleeves and sleeve stops such as those pictured in FIGS. 1-8 may be coupled to a previously installed pressure relief device.

Although embodiments of the present disclosure and their advantages have been described in detail, it should be understood that various changes, substitutions and alterations can be made herein without departing from the spirit and scope of the invention as defined by the following claims. For example, although the disclosure describes particular embodiments with reference to a straight or Y-shaped vapor conduit, various embodiments contemplate flexibility in the configuration and dimensions of the vapor conduit. Additionally, while the disclosure describes certain embodiments with respect to a railroad tank car, particular embodiments may be used for a variety of pressure chambers or other vessels capable of transporting liquids such as a tanker truck.

Other advantages of particular embodiments include increasing the fire survivability rating of a railroad tank car less expensively than alternative methods of thermal protection such as insulation.

What is claimed is:

1. A pressure relief valve system, comprising:
   a valve body coupled to a pressure chamber, the valve body defining a vapor flow path between the pressure chamber and the atmosphere;
   a valve orifice in the valve body configured to allow a vapor to flow between the pressure chamber and the valve body;
   a vapor conduit comprising:
      a vapor conduit first end coupled to the valve orifice;
      a vapor conduit second end opening into the pressure chamber proximate an opposite side of the pressure chamber from the valve body;
      the vapor conduit forming a passageway between the vapor conduit first end and the vapor conduit second end;
      a vapor conduit orifice disposed near the vapor conduit first end such that the vapor conduit orifice is in communication with a vapor space of the pressure chamber when the valve body is positioned above a horizontal axis of the pressure chamber, the vapor conduit orifice configured to allow the vapor to flow from the pressure chamber into the vapor conduit;
   a first gravity-operated valve positioned near the vapor conduit orifice, the first gravity-operated valve configured to control the flow of the vapor through the vapor conduit orifice such that when the valve body is positioned above the horizontal axis of the pressure chamber the first gravity-operated valve unseals the vapor conduit orifice forming a vapor flow path through the vapor conduit orifice to the atmosphere, and when the valve body is positioned below the horizontal axis of the pressure chamber the first gravity-operated valve substantially seals the vapor conduit orifice forming a vapor flow path through the vapor conduit second end to the atmosphere.

2. The system of claim 1, wherein the first gravity-operated valve comprises a vapor conduit sleeve slidably positioned around the vapor conduit first end, the vapor conduit sleeve configured to control the flow of the vapor through the vapor conduit orifice; and
   the vapor conduit sleeve operable to:
      slide to a first position unsealing the vapor conduit orifice when the valve body is positioned above a horizontal axis of the pressure chamber; and
      slide to a second position substantially sealing the vapor conduit orifice when the valve body is positioned below the horizontal axis of the pressure chamber.

3. The system of claim 2, further comprising an O-ring disposed between the vapor conduit and the vapor conduit sleeve.

4. The system of claim 2, wherein the vapor conduit sleeve is positioned internal to the vapor conduit.

5. The system of claim 2, further comprising a sleeve stop coupled to the vapor conduit, the sleeve stop configured to prevent the vapor conduit sleeve from sliding on the vapor conduit.

6. The system of claim 5, wherein the sleeve stop comprises a rod that passes through the vapor conduit.

7. The system of claim 1, wherein the vapor conduit second end comprises a first radial opening positioned in a first portion of the pressure chamber and a second radial opening positioned in a second portion of the pressure chamber, the first portion of the pressure chamber different from the second portion of the pressure chamber.

8. The system of claim 7, further comprising a second gravity-operated valve coupled to at least one of the first radial opening and the second radial opening, the second gravity-operated valve configured to control the flow of the vapor through at least one of the first radial opening and the second radial opening.

9. A pressure relief valve, comprising:
   a valve body, the valve body defining a vapor flow path between a first valve orifice and a second valve orifice;
   a vapor conduit comprising:
      a vapor conduit first end coupled to the first valve orifice; and
      a vapor conduit distal end;
   the vapor conduit forming a passageway between the vapor conduit first end and the vapor conduit distal end;
   a vapor conduit orifice disposed at the vapor conduit first end, the vapor conduit orifice configured to allow a vapor to flow into the vapor conduit;
   a first gravity-operated valve positioned near the vapor conduit orifice, the first gravity-operated valve configured to control the flow of the vapor through the vapor conduit orifice such that when the vapor conduit is positioned substantially below the valve body the first gravity-operated valve unseals the vapor conduit orifice forming a vapor flow path through the vapor conduit orifice to the atmosphere, and when the vapor conduit is positioned substantially above the valve body the first gravity-operated valve substantially seals the vapor conduit orifice forming a vapor flow path through the vapor conduit distal end to the atmosphere.

10. The valve of claim 9, wherein the first gravity-operated valve comprises a vapor conduit sleeve slidably positioned around the vapor conduit first end, the vapor conduit sleeve configured to control the flow of the vapor through the vapor conduit orifice; and
    the vapor conduit sleeve operable to:
       slide to a first position unsealing the vapor conduit orifice when the vapor conduit is positioned substantially below the valve body; and
       slide to a second position substantially sealing the vapor conduit orifice when the vapor conduit is positioned substantially above the valve body.

11. The valve of claim 10, further comprising an O-ring disposed between the vapor conduit and the vapor conduit sleeve.

12. The valve of claim 10, wherein the vapor conduit sleeve is positioned internal to the vapor conduit.

13. The valve of claim 10, further comprising a sleeve stop coupled to the vapor conduit, the sleeve stop configured to prevent the vapor conduit sleeve from sliding on the vapor conduit.

14. The valve of claim 13, wherein the sleeve stop comprises a rod that passes through the vapor conduit.

15. The valve of claim 9, wherein the vapor conduit distal end comprises a first radial opening oriented in a first direction and a second radial opening oriented in a second direction.

16. The valve of claim 15, further comprising a second gravity-operated valve coupled to at least one of the first radial opening and the second radial opening, the second gravity-operated valve configured to control the flow of the vapor through at least one of the first radial opening and the second radial opening.

17. The valve of claim 9, wherein the vapor conduit comprises a plurality of threaded sections.

18. A method for transporting liquid, comprising:
 loading a liquid into a transportation container wherein the transportation container comprises a pressure relief system comprising:
  a valve body coupled to a pressure chamber, the valve body defining a vapor flow path between the pressure chamber and the atmosphere;
  a valve orifice in the valve body configured to allow a vapor to flow between the pressure chamber and the valve body;
  a vapor conduit comprising:
   a vapor conduit first end coupled to the valve orifice;
   a vapor conduit second end opening into the pressure chamber proximate an opposite side of the pressure chamber from the valve body;
   the vapor conduit forming a passageway between the vapor conduit first end and the vapor conduit second end;
   a vapor conduit orifice near the vapor conduit first end such that the vapor conduit orifice is in communication with a vapor space of the pressure chamber when the valve body is positioned above a horizontal axis of the pressure chamber, the vapor conduit orifice configured to allow the vapor to flow from the pressure chamber into the vapor conduit;
  a gravity-operated valve positioned near the vapor conduit orifice, the gravity-operated valve configured to control the flow of the vapor through the vapor conduit orifice such that when the valve body is positioned above the horizontal axis of the pressure chamber the first gravity-operated valve unseals the vapor conduit orifice forming a vapor flow path through the vapor conduit orifice to the atmosphere, and when the valve body is positioned below the horizontal axis of the pressure chamber the first gravity-operated valve substantially seals the vapor conduit orifice forming a vapor flow path through the vapor conduit second end to the atmosphere.

* * * * *